Nov. 7, 1944.                H. SWANSON                 2,362,175
                  PIPED LIGHT FULL-BEAM ELECTRIC LAMP
                     Filed March 25, 1943          7 Sheets-Sheet 1

Nov. 7, 1944. H. SWANSON 2,362,175
PIPED LIGHT FULL-BEAM ELECTRIC LAMP
Filed March 25, 1943 7 Sheets-Sheet 2

Witnesses:
Florence Hilston
Gustave W. Hilston

Inventor
Harold Swanson

Nov. 7, 1944. H. SWANSON 2,362,175
PIPED LIGHT FULL-BEAM ELECTRIC LAMP
Filed March 25, 1943 7 Sheets-Sheet 3

Witnesses:
Florence Hilston
Gustave W. Hilston

Inventor
Harold Swanson

Nov. 7, 1944.  H. SWANSON  2,362,175
PIPED LIGHT FULL-BEAM ELECTRIC LAMP
Filed March 25, 1943  7 Sheets-Sheet 5

Witnesses:
Florence Hilston
Gustave W. Hilston

Inventor
Harold Swanson

Nov. 7, 1944.   H. SWANSON   2,362,175
PIPED LIGHT FULL-BEAM ELECTRIC LAMP
Filed March 25, 1943   7 Sheets-Sheet 6

Fig.53

Witnesses:
Florence Hilston
Gustave W. Hilston

Inventor
Harold Swanson

Fig. 54

Patented Nov. 7, 1944

2,362,175

UNITED STATES PATENT OFFICE 2,362,175

PIPED LIGHT FULL-BEAM ELECTRIC LAMP

Harold Swanson, Brownhelm Township, Lorain County, Ohio

Application March 25, 1943, Serial No. 480,424

5 Claims. (Cl. 176—34)

This invention relates to improvements for adapting electric lamps to piped light use in making advertising signs, decorations, displays, etc.

One object of this invention is to show a practical means of constructing an electric lamp with optical elements that completely surrounds the lamp's light source to gather the light produced into a concentrated beam that can be focused into light transmitting rods which become luminous at desired intervals throughout its length. These optical elements are described herein as full-beam refracting elements, and it is through them that full-beam electric lamps are made possible which are the light sources for the luminous rods in this invention. While it is old to use small electric lamps for piped light use, yet its usage was small due to the inefficient light gathering means of those lamps used therewith. With these new full-beam electric lamps, the light gathering efficiency has been greatly increased so that piped light use can be developed into many more applications than previously existed; therefore this invention in reality becomes an improved method to use piped light for luminous signs, displays, etc. which were not made heretofore, and the full-beam electric lamp used therewith.

A further object is that this application, together with my copending applications Serial Numbers 480,420; 480,421; 480,422; 480,423 and 480,425, filed March 25, 1943, is in part a continuation of my full-beam electric lamp application Serial Number 402,778, filed July 17, 1941, now abandoned in which nearly an exact duplicated description of these inventions were originally presented. The feature which is generic to all of these inventions is the full-beam refracting element and its adaptation in construction, and operation to gather the light in nearly all directions from a light source into a concentrated beam, as applied to electric lamps; however on account of the present Patent Office regulations restricting the limitations presented in a single application, it was necessary to segregate these applications.

A further object is to show that certain improvements set forth in my original application Serial Number 744,598, filed Sept. 18, 1934, and subsequently continued through the following: Patent Number 2,097,679, patented Nov. 2, 1937, Patent Number 2,137,732, patented Nov. 22, 1938, Patent Number 2,154,542, patented April 18, 1939, Patent Number 2,222,093, patented Nov. 19, 1940, are adaptable to make piped light full-beam electric lamps and similar articles.

A further object is that this invention is a continuation of my earlier inventions mentioned in the preceding paragraph, in respect to where any improvements or subject matter of my earlier inventions can be used to advantage with the improvements of this invention, particularly the use of hollow metal wires and their many features which are described in the previous applications or patents and in this application.

A further object is that many features or improvements used in connection with my copending applications, previously referred to, can be used to advantage with this application, particularly the full-beam refracting elements and the many cross combinations possible by their substitution herein.

While it is practical to adapt the improvements of this invention to a large variety of electric lamps, the present Patent Office regulations restrict the claims that are allowed in a single patent which illustrates more than three types. In the accompanying drawings I have illustrated several types of lamps to show that I have not overlooked the possibilities of many variations to apply these improvements. The one feature which is common or generic to all types shown, is the full-beam refracting elements adapted to piped light electric lamps, around which this invention becomes apparent by the following in which:

Fig. 7 to Fig. 10 and Fig. 13 and Fig. 14 are enlarged sectional views of full-beam refracting element assemblies. Fig. 11 is an end elevation and Fig. 12 being a developed detail view of the filament for Fig. 10. Fig. 15 being an end view of the filament for Fig. 14.

Fig. 16 is an enlarged sectional view of a full-beam electric lamp.

Fig. 17 to Fig. 52 are enlarged elevational and sectional views of full-beam refracting elements for full-beam electric lamps with some views also showing their connecting parts.

Other objects of this invention will appear more fully described and illustrated hereinafter.

Figure 1:
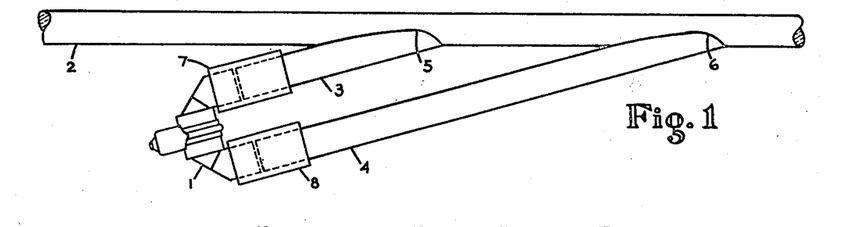
Fig. 1 to Fig. 4 are elevational views of full-beam electric lamps adapted to piped light use.
Figures 16, 17, 18, 19, 20, 21, 22:
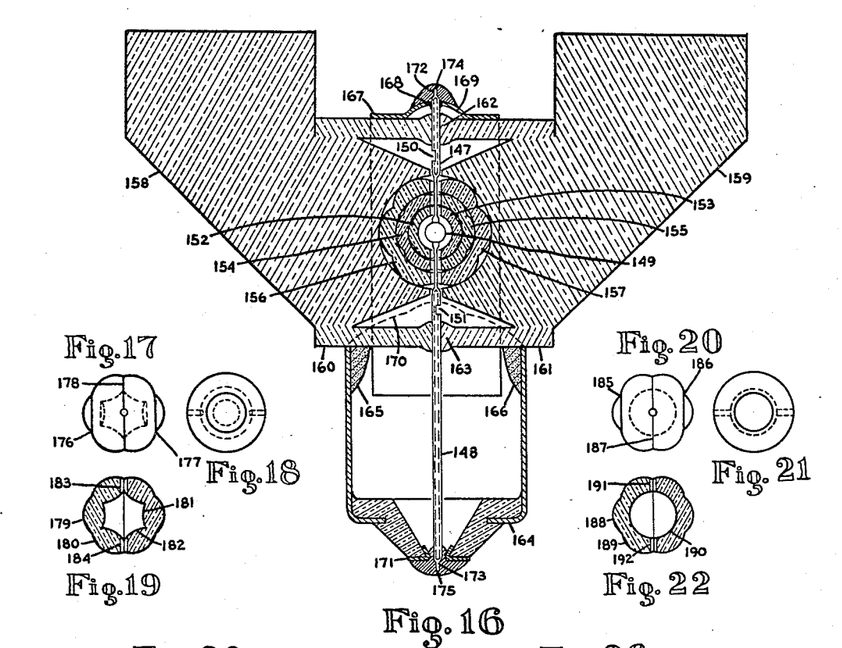

Referring to Fig. 1 which is an elevation of a full-beam electric lamp adapted to piped light use; having a full-beam electric lamp 1 which is made similar to the lamp in Fig. 16; a glass rod 2 which can be made to any suitable length and formed into any practical design of luminous display; a short glass rod 3 and a long glass rod 4 both of predetermined lengths with one end cut off approximately square and the other end of each formed cylindrical at a suitable acute angle, to form fit rod 2; rods 3 and 4 are attached to rod 2 at 5 and 6 by glass fusion, being set approximately parallel and in alignment with the ends of lamp 1; the lamp 1 is held in place as shown by pieces of rubber tubing 7 and 8.

Figure 2:
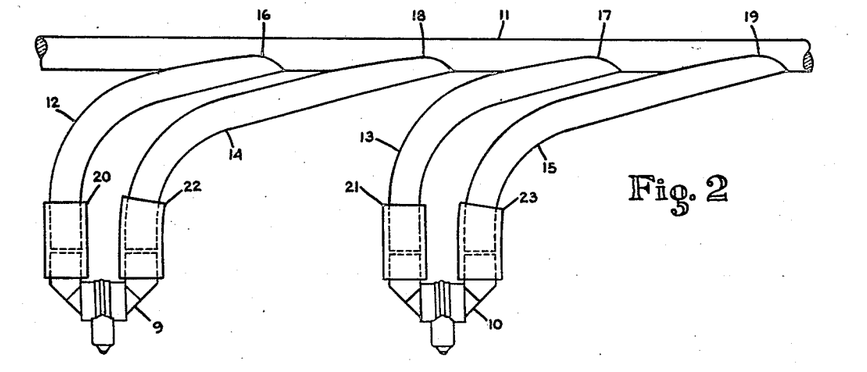

Referring to Fig. 2 which is an elevation of two full-beam electric lamps adapted to piped light use; having two full-beam electric lamps 9 and 10, each made similar to the lamp in Fig. 16; a glass rod 11 which can be made to any suitable length and formed into any practical design of luminous display; two bent short glass rods 12 and 13, and two bent long glass rods 14 and 15, all of predetermined length with one end cut off approximately square and the other end of each formed cylindrical at a suitable acute angle to form fit rod 11; rods 12, 13, 14, and 15 are attached to rod 11 at 16, 17, 18, and 19 respectively by glass fusion, being set approximately parallel and in alignment with the ends of lamps 9 and 10; the lamps 9 and 10 are held in place as shown by pieces of rubber tubing 20, 21, 22, and 23.

Figure 3:
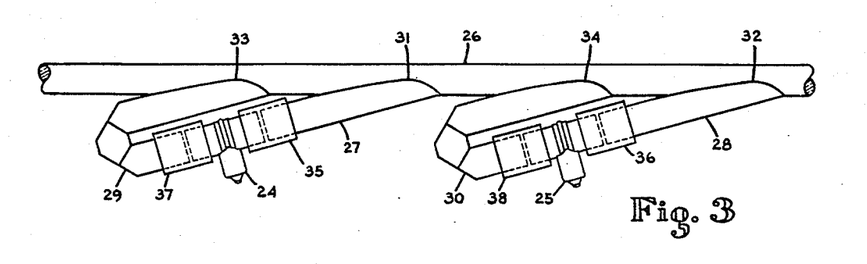
Figure 6:
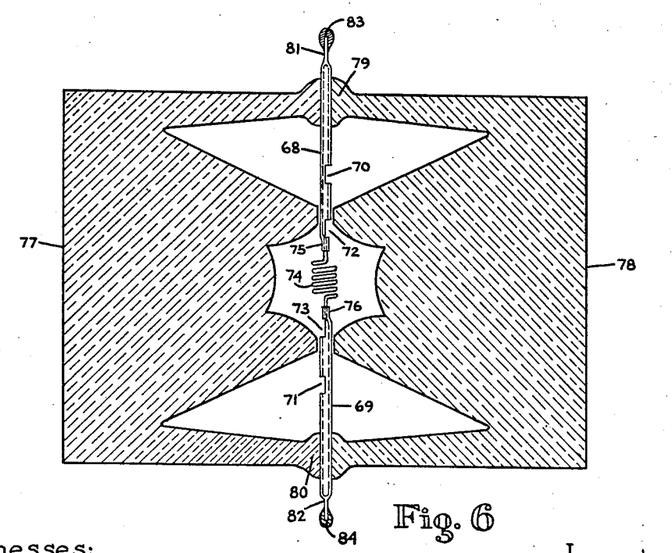

Referring to Fig. 3 which is an elevation of two full-beam electric lamps adapted to piped light use; having two full-beam electric lamps 24 and 25, each made similar to the lamp in Fig. 6 with a lamp base similar to parts 164 and 167 in Fig. 16; a glass rod 26 which can be made to any suitable length and formed into any practical design of luminous display; two short glass rods 27 and 28, and two 180° prism glass rods 29 and 30, all of predetermined length with one end cut off approximately square and the other end of each formed cylindrical at a suitable acute angle to form fit rod 26; rods 27, 28, 29, and 30 are attached to rod 26 at 31, 32, 33, and 34 respectively by glass fusion, being set approximately parallel and in alignment for lamps 24 and 25; the lamps 24 and 25 are held in place by pieces of rubber tubing 35, 36, 37, and 38.

Figure 4:
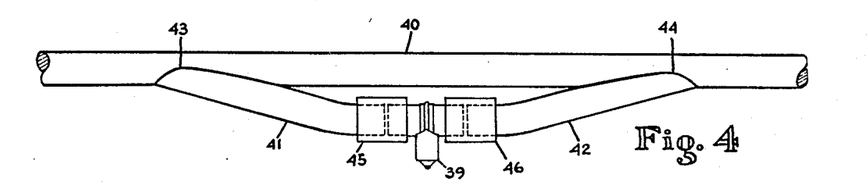

Referring to Fig. 4 which is an elevation of a full-beam electric lamp adapted to piped light use; having a full-beam electric lamp 39 which is made similar to the lamp in Fig. 6 with a lamp base similar to parts 164 and 167 in Fig. 16; a glass rod 40 which can be made to any suitable length and formed into any practical design of luminous display; two bent glass rods 41 and 42 of equal length with one end cut off approximately square and the other end of each formed cylindrical at a suitable acute angle to form fit rod 40; rods 41 and 42 are attached to rod 40 at 43 and 44 by glass fusion, being set in alignment for lamp 39; the lamp 39 is held in place as shown by pieces of rubber tubing 45 and 46.

Figure 5:
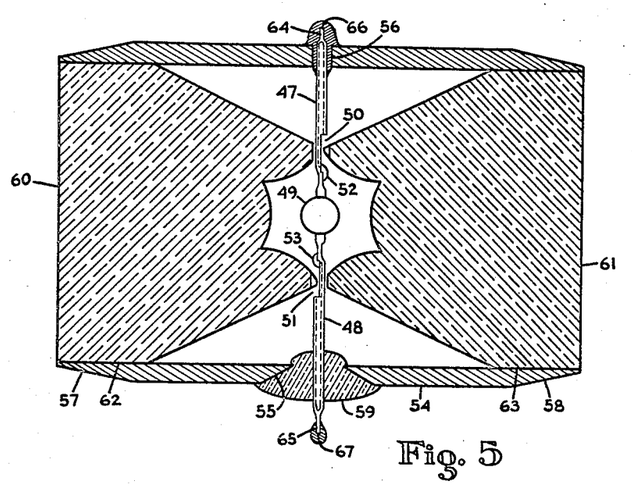
Fig. 5 and Fig. 6 are enlarged sectional views of full-beam electric lamps.

Referring to Fig. 5 which is an enlarged sectional view of a full-beam electric lamp; having two hollow metal wires 47 and 48 being the lead-in wires which were previously made integrally with a pin-head electric lamp 49 (see previously mentioned Patent 2,222,093 for details of pin-head electric lamp) and later notched openings cut through the walls at 50 and 51 (after preliminary seals are made) to facilitate the exhausting of the full-beam electric lamp and to permit the final sealing of the pin-head electric lamp which is independently soldered air tight at 52 and 53; all of which being inserted into a thin wall copper, or other suitable metal, tube 54 through a relatively large countersunk feathered edge hole at 55 in alignment with the small hole at 56, and soldered together with the hollow metal wire 47 at 56; the metal tube 54 is made with beveled ends at 57 and 58 to facilitate hermetic sealing; the countersunk hole at 55 is coated and fused with a mass of suitable glass fusing material to form the insulating plug 59 being hermetically sealed with the hollow metal wire 48 and hole at 55; two half full-beam refracting elements 60 and 61 (see Fig. 50 to Fig. 52 for details) being made from heat resisting glass, are coated with a film of suitable glass fusing material encircling them at 62 and 63, and are hermetically sealed by glass fusion with the metal tube 54; then the lamp is exhausted to a vacuum, or exhausted and filled with an inert gas, or a heat dissipating gas such as hydrogen, at either low or high pressures, through the hollow metal wires 47 and 48 which are swaged or flattened and cut off to form the preliminary seals at 64 and 65; later the final seals at 66 and 67 are made by soldering, brazing, electric welding, or otherwise closing the ends air tight.

In Fig. 5 it is obvious that the pin-head electric lamp, when finally sealed at 52 and 53, can be surrounded with air at atmospheric pressure and the outer ends of the hollow metal wires 47 and 48 closed to be dust tight without being actually air tight.

In Fig. 5 when atmospheric air surrounds the pin-head electric lamp as mentioned in the preceding paragraph, the metal tube 54 can be made from any suitable metal such as brass (which is difficult to hermetically seal with glass) and cemented with any suitable cement to the refracting elements 60 and 61 to be dust tight without being air tight.

Referring to Fig. 6 which is an enlarged sectional view of a full-beam electric lamp; having two hollow metal wires 68 and 69 being the lead-in wires with notched openings cut through the walls at 70, 71, 72, and 73 respectively; the ends of a coiled electric lamp filament 74 being inserted into the ends of the hollow metal wires 68 and 69 which are clamped or spot welded together at 75 and 76 forming the filament mount; two half full-beam refracting elements 77 and 78 (see Fig. 26 to Fig. 28 for details) being made from heat resisting glass are coated on their junction surfaces at 79 and 80 with a film of suitable glass fusing material, and after positioning the filament mount in place as shown, they are hermetically butt-sealed together by glass fusion at 79 and 80; then the lamp is exhausted to a vacuum, or exhausted and filled with an inert gas at either low or high pressures, up to the safe working pressure, through the hollow metal wires 68 and 69 which are swaged or flattened and cut off to form the preliminary seals at 81 and 82; later the final seals at 83 and 84 are made by soldering, brazing, electric welding, or otherwise closing the ends air tight.

Figures 7, 8, 11:
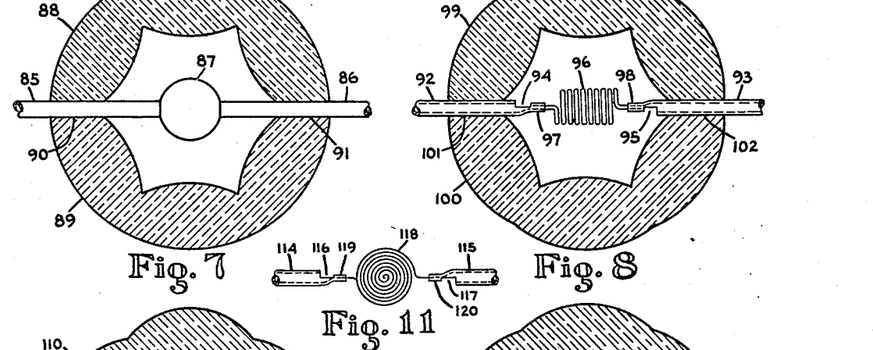

Referring to Fig. 7 which is an enlarged sectional view of an inner full-beam refracting element assembly; having two hollow metal wires 85 and 86 being the lead-in wires which were previously made integrally with a pin-head electric lamp 87 (see previously mentioned Patent 2,222,093, for details of pin-head electric lamp); two hemispherical refracting elements 88 and 89 being made from heat resisting glass, are coated on their junction surfaces with a film of suitable glass fusing material, into which the pin-head electric lamp 87 is positioned, enclosed, and hermetically sealed by glass fusion at 90 and 91.

Referring to Fig. 8 which is an enlarged sectional view of an inner full-beam refracting element assembly; having two hollow metal wires 92 and 93 being the lead-in wires with notched openings cut through the walls at 94 and 95; the ends of a coiled electric lamp filament 96 being inserted into the ends of the hollow metal wires 92 and 93, which are clamped or spot-welded together at 97 and 98, forming the filament mount; two hemispherical refracting elements 99 and 100 (see Fig. 17 to Fig. 19 for details) being made from heat resisting glass, are coated on their junction surfaces with a film of suitable glass fusing material, into which the filament mount is positioned, enclosed, and hermetically sealed by glass fusion at 101 and 102.

Figures 9, 10, 12, 13, 14, 15:
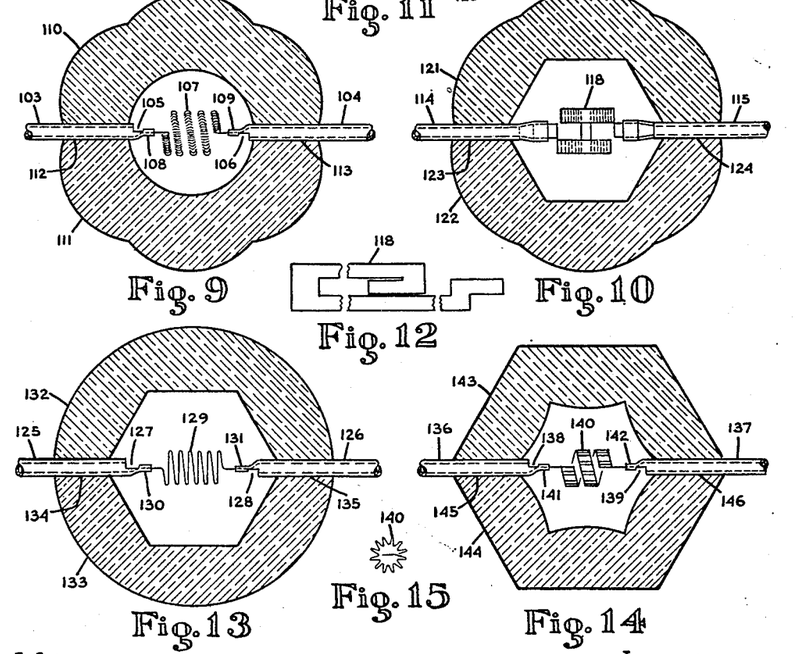

Referring to Fig. 9 which is an enlarged sectional view of an inner full-beam refracting element assembly; having two hollow metal wires 103 and 104 being the lead-in wires with notched openings cut through the walls at 105 and 106; the ends of a coiled coil electric lamp filament 107 being inserted into the ends of the hollow metal wires 103 and 104, which are clamped or spot-welded together at 108 and 109, forming the filament mount; two hemispherical refracting elements 110 and 111 (see Fig. 20 to Fig. 22 for details) being made from heat resisting glass, are coated on their junction surfaces with a film of suitable glass fusing material, into which the filament mount is positioned, enclosed, and hermetically sealed by glass fusion at 112 and 113.

Referring to Fig. 10 which is an enlarged sectional view of an inner full-beam refracting element assembly; having two hollow metal wires 114 and 115 being the lead-in wires with notched openings cut through the walls at 116 and 117 in Fig. 11; the ends of a clock spring spiral electric lamp filament 118 being inserted into the ends of the hollow metal wires 114 and 115, which are clamped or spot-welded together at 119 and 120 in Fig. 11 forming the filament mount; two hemispherical refracting elements 121 and 122 (see Fig. 29 to Fig. 31 for details) being made from heat resisting glass, are coated on their junction surfaces with a film of suitable glass fusing material, into which the filament mount is positioned, enclosed, and hermetically sealed by glass fusion at 123 and 124.

Fig. 11 is a side or end elevation, and Fig. 12 the developed detail view of the filament 118 which is shown in Fig. 10.

Referring to Fig. 13 which is an enlarged sectional view of an inner full-beam refracting element assembly; having two hollow metal wires 125 and 126 being the lead-in wires with notched openings cut through the walls at 127 and 128; the ends of a crimped ribbon electric lamp filament 129 being inserted into the ends of the hollow metal wires 125 and 126, which are clamped or spot-welded together at 130 and 131, forming the filament mount; two hemispherical refracting elements 132 and 133 (see Fig. 32 to Fig. 34 for details) being made from heat resisting glass, are coated on their junction surfaces with a film of suitable glass fusing material, into which the filament mount is positioned, enclosed, and hermetically sealed by glass fusion at 134 and 135.

Referring to Fig. 14 which is an enlarged sectional view of an inner full-beam refracting element assembly; having two hollow metal wires 136 and 137 being the lead-in wires with notched openings cut through the walls at 138 and 139; the ends of a crimped ribbon coiled electric lamp filament 140 being inserted into the ends of the hollow metal wires 136 and 137, which are clamped or spot-welded together at 141 and 142, forming the filament mount; two hemispherical refracting elements 143 and 144 (see Fig. 35 to Fig. 37 for details) being made from heat resisting glass, are coated on their junction surfaces with a film of suitable glass fusing material, into which the filament mount is positioned, enclosed, and hermetically sealed by glass fusion at 145 and 146.

Fig. 15 is an end view of the filament 140 which is shown in Fig. 14.

Referring to Fig. 16 which is an enlarged sectional view of a full-beam electric lamp; having two hollow metal wires 147 and 148 being the lead-in wires which were previously made integrally with a pin-head electric lamp 149 (see previously mentioned Patent Number 2,222,093, for details of pin-head electric lamp) and later notched openings cut through the walls at 150 and 151; three sets of inner full-beam refracting elements (see Fig. 20 to Fig. 22 for details of one set), 152 and 153 the first set, 154 and 155 the second set, 156 and 157 the third set, all being made from heat resisting glass, with each set made progressively larger so as to enclose the previous set, and enclose the pin-head electric lamp 149; all of which are inserted into two outer half full-beam refracting elements 158 and 159 being made from heat resisting glass, with glass tubes 160 and 161 previously hermetically sealed thereto by glass fusion (see Fig. 23 to Fig. 25 for details), which are coated on their junction ends with a film of suitable glass fusing material and hermetically butt-sealed together by glass fusion at 162, 163, forming the unbased lamp; a lamp base 164 which can be made similar to a standard screw or bayonet base with its open end cut horizontally cylindrical to form fit the tubes 160 and 161, is coated with a suitable basing cement all around its inside edge at 165 and 166 and later heated for cementing together; a formed thin metal clasp 167 having a hole at 168, and a raised groove at 169, affording clearance for the butt-sealed joint at 162 and 163, is placed over the hollow metal wire 147 and tightly wrapped around the unbased lamp, as its ends are inserted into the lamp base 164, with the other hollow metal wire 148 extending through the base eyelet 171, and then both front and rear ends of the clasp 167 are soldered to the lamp base 164 at 170 (only the rear half of clasp 167 is shown); then the lamp is exhausted to a vacuum, or exhausted and filled with a heat dissipating gas such as hydrogen, at either low or high pressures, up to a safe working pressure, through the hollow metal wires 147 and 148 which are swaged or flattened and cut off to form the preliminary seals at 172 and 173; later the final seals at 174 and 175 are made by either soldering, brazing, electric welding, or otherwise closing the ends air tight.

In Fig. 17 to Fig. 52, the details are generally symmetrical about their center lines, and for convenience, so as not to crowd the numbers, I have shown the numbers designating details of either half indiscriminately, and in only one view.

In Fig. 17 to Fig. 52, each part is shown by three views in third-angle orthographic projection, a plan or top elevation, a side elevation, and the lower one being a center sectional view.

Referring to Fig. 17 to Fig. 19 collectively which show enlarged views of the inner refracting elements for a full-beam electric lamp; having two half full-beam refracting elements 176 and 177 being made from heat resisting glass and fitting together on their center line junction surfaces at 178; each element 176 or 177 having an outer small convex lens surface at 179, with the other outer surfaces at 180 formed into a cone frustum whose flanks are shaped to a convex lens cross-section; each element 176 or 177 having a light source chamber which is formed into a small convex lens surface at 181, with the other inner surfaces at 182 formed into a cone frustum whose flanks are shaped to a convex lens cross-section; lead-in wire grooves are formed at 183 and 184. Elements 176 and 177 are constructed around the equatorial axis.

Referring to Fig. 20 to Fig. 22 collectively which shows enlarged views of the inner refracting elements for a full-beam electric lamp; having two half full-beam refracting elements 185 and 186 being made from heat resisting glass and fitting together on their center line junction surfaces at 187; each element 185 or 186 having an outer small convex lens surface at 188, with the other outer surfaces at 189 formed around into a cone frustum whose flanks are shaped to a convex lens cross-section; each element 185 or 186 having a hemispherical light source chamber at 190; lead-in wire grooves are formed at 191 and 192. Elements 185 and 186 are constructed around the equatorial axis.

Figures 23, 24, 25, 26, 27, 28:
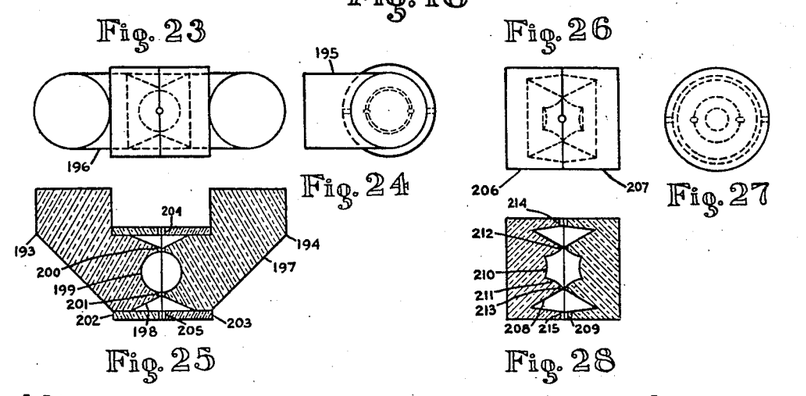

Referring to Fig. 23 to Fig. 25 collectively which show enlarged views of the outer refracting elements for a full-beam electric lamp; having two half full-beam refracting elements 193 and 194 being made from heat resisting glass; each element 193 or 194 having a cylindrical boss 195 being miter joined to a cylindrical body 196, both of which are mitered to form a 90° (approximate) prism light reflecting surface at 197; the end of the cylindrical body 196 is a cone frustum whose flanks form a 120° (approximate) prism light reflecting surface at 198 for light rays radiating from the center of the light source chamber; the inner end of the cylindrical body 196 is recessed into a light source chamber being an hemisphere at 199; lead-in wire grooves are formed at 200 and 201; two glass connecting tubes 202 and 203 with lead-in wire grooves formed at 204 and 205, are made to just fit over the cylindrical body 196. The cylindrical body 196 is constructed around the equatorial axis, while the cylindrical boss 195 is parallel to the polar axis which passes through the lead-in wire grooves at 200, 201, 204, and 205.

In Fig. 23 to Fig. 25, it is obvious that the tubes 202 and 203 can be formed integrally with elements 193 and 194, and then the body 196 with the boss at 195 can be increased to the same diameter as the tubes 202 and 203 are shown here. Also the light source chamber at 199 can be formed to any shape of the light source chambers within the inner full-beam refracting elements shown in Fig. 17 to Fig. 19, or in Fig. 32 to Fig. 34, or in Fig. 38 to Fig. 46, herein.

Referring to Fig. 26 to Fig. 28 collectively which shows enlarged views of the refracting elements for a full-beam electric lamp; having two half full-beam refracting elements 206 and 207 being made from heat resisting glass; each element 206 or 207 having a cylindrical body with one end made approximately square and the other end recessed into a cone frustum whose flanks form a 120° (approximate) prism light reflecting surface at 208 for light rays radiating from the center of the light source chamber, and tapering to a cone frustum at 209, and also recessed into a light source chamber with a small convex lens surface at 210 and a cone frustum at 211 whose flanks are shaped to a convex lens cross-section; lead-in wire grooves are formed at 212, 213, 214, and 215. Elements 206 and 207 are constructed around the equatorial axis.

Figures 29, 30:
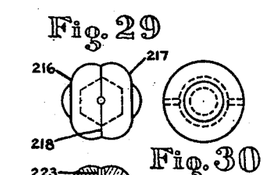
Figure 31:
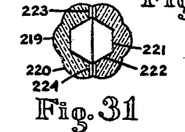

Referring to Fig. 29 to Fig. 31 collectively which shows enlarged views of the inner refracting elements for a full-beam electric lamp; having two half full-beam refracting elements 216 and 217 being made from heat resisting glass and fitting together on their center line junction surfaces 218; each element 216 or 217 having an outer small convex lens surface at 219, with the other outer surfaces at 220 formed into a cone frustum whose flanks are shaped to a convex lens cross-section; each element 216 or 217 having a light source chamber which is formed by cone frustum surfaces at 221 and 222; lead-in wire grooves are formed at 223 and 224. Elements 216 and 217 are constructed around the equatorial axis.

Figure 32:
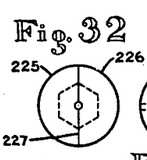
Figure 33:
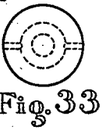
Figure 34:
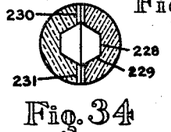

Referring to Fig. 32 to Fig. 34 collectively which shows enlarged views of the inner refracting elements for a full-beam electric lamp; having two half full-beam refracting elements 225 and 226 each being an hemisphere made from heat resisting glass and fitting together on their center line junction surfaces at 227; each element 225 or 226 having a light source chamber which is formed by cone frustum surfaces at 228 and 229; lead-in wire grooves are formed at 230 and 231. Elements 225 and 226 are constructed around the equatorial axis.

Figures 35, 36, 37:
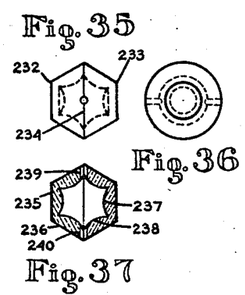

Referring to Fig. 35 to Fig. 37 collectively which show enlarged views of the inner refracting elements for a full-beam electric lamp; having two half full-beam refracting elements 232 and 233 being made from heat resisting glass and fitting together on their center line junction surfaces at 234; each element 232 or 233 having outer cone frustum surfaces at 235 and 236; each element 232 or 233 having a light source chamber which is formed into a small convex lens surface at 237, with the other inner surfaces at 238 formed into a cone frustum whose flanks are shaped to a convex lens cross-section; lead-in wire grooves are formed at 239 and 240. Elements 232 and 233 are constructed around the equatorial axis.

Figures 38, 39, 40:
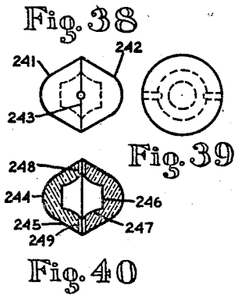

Referring to Fig. 38 to Fig. 40 collectively which show enlarged views of the inner refracting elements for a full-beam electric lamp; having two half full-beam refracting elements 241 and 242 being made from heat resisting glass and fitting together on their center line junction surfaces at 243; each element 241 or 242 having an outer small convex lens surface at 244, with the other outer surfaces at 245 formed into a cone frustum (in the illustration, if the surface at 244 was made with a longer radius, then the cone frustum shape would be more apparent instead of the rounded top cone appearance); each element 241 or 242 having a light source chamber which has a small circular flat surface at 246, with the other inner surfaces at 247 formed into a cone frustum whose flanks are shaped to a convex lens cross-section; lead-in wire grooves are formed at 248 and 249. Elements 241 and 242 are constructed around the equatorial axis.

Referring to Fig. 41 to Fig. 43 collectively which show enlarged views of the inner refracting elements for a full-beam electric lamp; having two half full-beam refracting elements 250 and 251 being made from heat resisting glass and fitting together on their center line junction surfaces at 252; each element 250 or 251 having its outer surface formed into a cone frustum whose flanks at 253 are shaped to a convex lens cross-section, and a circular flat at 254 (in the illustration, if the surface at 253 was made with a longer radius, then the cone frustum shape would be more apparent); each element 250 and 251 having a light source chamber which is formed into a small convex lens surface at 255, with the other inner surfaces at 256 formed into a cone frustum; lead-in wire grooves are formed at 257 and 258. Elements 250 and 251 are constructed around the equatorial axis.

Referring to Fig. 44 to Fig. 46 collectively which show enlarged views of the inner refracting elements for a full-beam electric lamp; having two half full-beam refracting elements 259 and 260 being made from heat resisting glass and fitting together on their center line junction surfaces at 261; each element 259 or 260 having its outer surface formed into a semi-spheroid; each element 259 or 260 having a light source chamber which is formed into a small convex lens surface at 262, with the other inner surfaces at 263 formed into a relatively shallow cone frustum whose flanks are shaped to a convex lens crosssection; lead-in wire grooves are formed at 264 and 265. Elements 259 and 260 are constructed around the equatorial axis.

Figure 47:
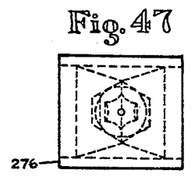
Figure 48:
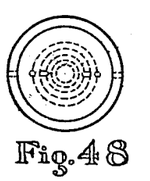
Figure 49:
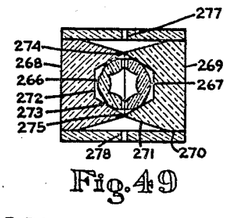

Referring to Fig. 47 to Fig. 49 collectively which show enlarged views of the refracting elements for a full-beam electric lamp; having two half full-beam inner refracting elements 266 and 267 (see Fig. 17 to Fig. 19 for details), and two half full-beam outer refracting elements 268 and 269, all being made from heat resisting glass; each element 268 or 269 having a cylindrical body at 270 with one end made approximately square and the other end made into a cone frustum whose flanks form a 120° (approximate) prism light reflecting surface at 271 for light rays radiating from the center of the light source chamber within elements 266 and 267; the inner end of each element 268 or 269 is recessed into a chamber whose surfaces at 272 and 273 form a cone frustum enclosing elements 266 and 267; lead-in wire grooves are formed at 274 and 275; a glass connecting tube 276 with lead-in wire holes at 277 and 278, is made to just fit over elements 268 and 269 at 270. Elements 268 and 269 are constructed around the equatorial axis.

Figure 50:
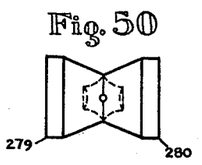
Figure 51:
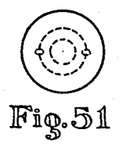
Figure 52:
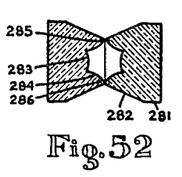

Referring to Fig. 50 to Fig. 52 collectively which show enlarged views of the refracting elements for a full-beam electric lamp; having two half full-beam refracting elements 279 and 280 being made from heat resisting glass; each element 279 or 280 having a cylindrical body at 281 with one end made approximately square and the other end made into a cone frustum whose flanks form a 120° (approximate) prism light reflecting surface at 282 for light rays radiating from the center of the light source chamber; the inner end of each element 279 or 280 is recessed into a light source chamber with a small convex lens surface at 283 and the other surfaces at 284 formed into a cone frustum whose flanks are shaped to a convex lens cross-section; lead-in wire grooves are formed at 285 and 286. Elements 279 and 280 are constructed around the equatorial axis.

Figure 53:
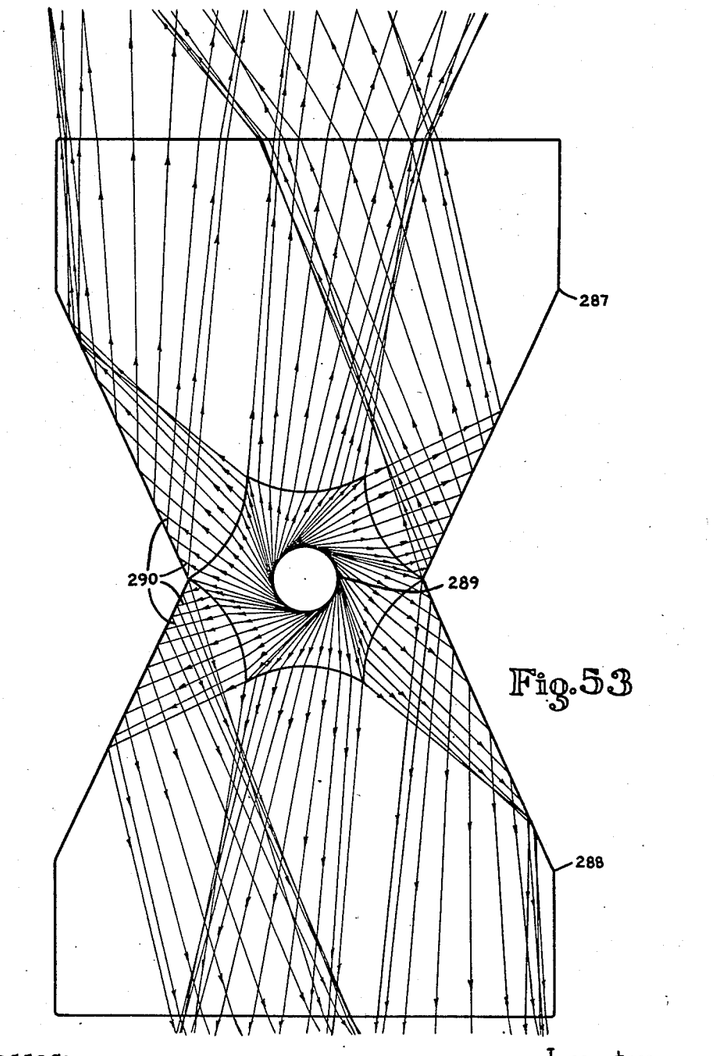
Fig. 53 and Fig. 54 are enlarged light propagation diagrammatic views of the full-beam refracting elements for the full-beam electric lamps.
Figure 54:
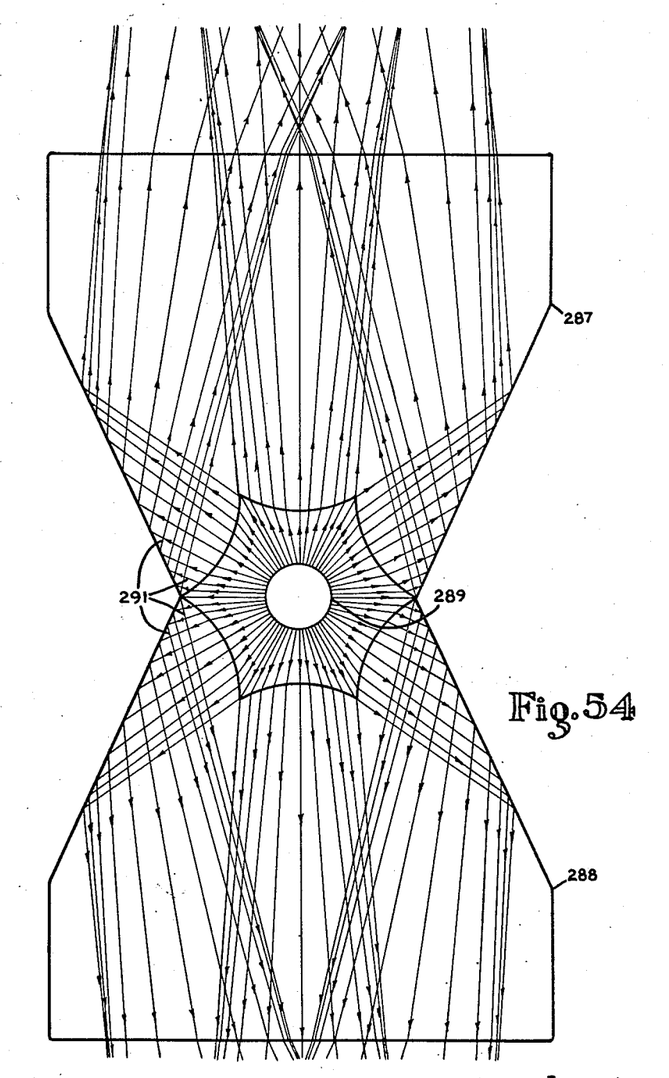

Before proceeding to describe Fig. 53 and Fig. 54, it might be well to state that these illustrations represent only one set of diagrams. The set of diagrams are for the same light source and full-beam refracting elements, which have the same identifying numbers in both diagrams. The difference between diagrams of the set being the light-ray lines, which are shown separately in two diagrams, rather than superimposed upon one another in one diagram, thereby avoiding graphic confusion.

In Figs. 53 and 54, when drawing the light-ray lines in each diagram, the refractive index of one and six-tenths (1.6) was used. This refractive index approximated a sodium D-ray (5893 Angstroms) in medium silicate flint glass. This refractive index would make a critical angle of thirty-eight degrees and forty-two minutes (38°42′) for glass to air refraction, and any light-ray whose angle of incidence exceeds the critical angle, would refract back into the glass like reflection on a back surfaced mirror (a common looking glass); however inasmuch as all reflecting surfaces can be mirror coated, the critical angle limits can be disregarded in these diagrams.

While Fig. 53 and Fig. 54 do not show all of the full-beam refracting elements described herein, yet they present a fair average of them, and by studying these diagrams with the full-beam refracting elements that they represent, comparable diagrams for the other refracting elements can be easily approximated. By keeping in mind that each arrowed line in the diagrams represents the approximate path of a light-ray, and that other light-rays approximately parallel to these lines are also propagating with them, then these diagrams become more or less self explanatory.

Referring to Fig. 53 and Fig. 54, which are enlarged diagrammatic views showing the light propagation within a full-beam refracting element for a full-beam electric lamp; having the full-beam refracting elements 287 and 288 (similar to elements 60 and 61 in Fig. 5) enclosing the light source 289. In Fig. 53 the light-rays are shown by arrowed lines 290 (several dozen shown) radiating from tangent surface points of the light source 289. In Fig. 54 the light-rays are shown by arrowed lines 291 (several dozen shown) radiating from surface points at the center of the light source 289. Lines 290 illustrate the propagation of light-rays radiating from points on one extreme edge of the light source 289 in clockwise fashion, and when viewed within a mirror, they appear from the other extreme edge in counterclockwise fashion; while lines 291 illustrate light-rays from the center or half way between these two extremes; then it is obvious that light-rays from any other point on the light source 289, would propagate on lines somewhere between lines 290 and 291. Light radiating from the light source 289 emerges from elements 287 and 288 in two opposing conical beams, which are brought together into one beam by the methods shown in Fig. 3.

In Fig. 16, there are three inner full-beam refracting elements, 152 and 153, 154 and 155, 156 and 157, shown. The purpose of so many elements, is much the same as making several elements in photographic, projection, and other types of lenses, in which better correction for spherical and chromatic aberration is obtained with shorter focal length lenses. Practically all of the features and characteristics which have been used and applied previously to making other types of lenses, can also be used with all of the full-beam refracting elements shown or described herein and in my copending applications Serial Numbers 480,420; 480,421; 480,422; 480,423 and 480,425. One of these features is the coating of lense surfaces with chemical deposits to reduce surface reflection and at the same time change the surface refractive index (sometimes called the second law of refraction), so as to require shorter lens radii or more lens elements to obtain the same focal length. The chemical deposits which are perhaps the best suited for this use, because of their permanence, being evaporated metallic fluorides, which were used by Cartwright and Turner in their researches and work with photographic lenses and other optical parts in making so called invisible glass. Their deposits were fluorides of sodium, aluminum, magnesium or lithium to reduce the refractive index, and antimony to increase the refractive index. The deposits were formed in coatings approximately one-quarter wave length (.000,004 inch) of thickness on the glass part surfaces by electrical vaporization in a vacuum chamber. Other chemical deposits on optical surfaces in extremely thin coatings have been perfected by other research workers to make non-reflecting glass, but their deposits seem to be less permanent than metallic compound deposits. All of these chemicals actually absorb light in very large percentages when compared with glass for a given unit of thickness, but owing to their infinitesimal deposited thickness, the total light absorption is almost nil, and the gains made through non-reflection has the effect to actually increase transmission. The light absorption effect having the following analogy: suppose one inch (1") thickness of a substance absorbs ninety-nine percent (99%) of the light radiating from a light source, then one-thousandth inch (.001") thickness would absorb proportionately only ninety-nine-thousandths of one percent (.099%) of that light, which is almost nil in practice, and yet very high in percentage of absorption for a given unit of thickness. This same analogy holds good for deposits of silver, aluminum, magnesium, gold, or any material, even black carbon. Some materials are good reflectors of light, like polished silver, while other materials are good absorbers of light, like a black body, such as amorphous carbon or lamp black. Generally thin deposits of good reflecting materials, increase the refractive index, while thin deposits of good absorbing materials, reduce the defractive index, barring molecular diffraction effects, when coated on glass or optical surfaces. With these features in mind it is obvious that future research will find ways and means to impregnate such deposits permanently into the surfaces of glass or other optical surfaces like the surfaces of the full-beam refracting elements shown and described herein.

In Fig. 1 to Fig. 4, any or all of the rods can be made from glass or any suitable transparent moulded plastic. Rods 2, 11, 26, and 40 can be formed into most any suitable shape just like electric glow tubes (sometimes called neon signs) used in advertising, decorations, displays, etc., and used with as many full-beam electric lamps connected thereto (as shown) as desired, to replace such electric glow tubes. At various points or sectional lengths along the rods 2, 11, 26 or 40 where light or luminosity is wanted to appear, a small frosted groove or flat can be formed on the side opposite the viewing side, while the other sectional lengths of the rods are left plain or they can be coated with silver or any other suitable metal to give mirrored surfaces and painted for protection, or wrapped with aluminum or other suitable metal foil and painted for protection; then when light passes along the rods, which are made into endless loops, from the full-beam electric lamps, those sectional lengths having the frosted grooves or flats will appear luminous just like an electric glow tube. The rods can be made alternately from lengths of solid rod, and lengths of small bore tubing which is frosted on the inside, with the tubing in those sections where illumination is to be viewed, and the solid rod in the other sections. Through this use of full-beam electric lamps, luminous rod signs can be made in competition with electric glow tube signs. Some of the advantages of the full-beam luminous rod signs over the electric glow tube signs, are as follows: lower voltage; various colors in the same luminous rods; lower initial cost; more rigid to withstand shock and vibration; easily repaired; can be repaired in most cases without removal from display hangers; can be made from short pieces of rod and fastened together with rubber tubing; no gas leakage troubles; easily disassembled for cleaning; shipped to and from destination in less expensive package cases; light intensity variations can be made with rheostat control; can be built with trailing light movements in what appears to be a single rod; continuous illumination with electrical cycle pulsations eliminated by incandescent light sources in the full-beam electric lamps when desired; can be made from materials other than glass; can be built from standardized forms and pieces which are fastened together to make a large variety of combinations.

In Fig. 7 to Fig. 15, the inner full-beam refraction element assemblies can be independently exhausted to a vacuum, or exhausted and filled with an inert gas, at either low or high pressures, up to a safe working pressure, through the hollow metal wires which are swaged or flattened and cut off and finally sealed with enough length to meet later mounting requirements; or cut off close to the elements and solid wires connected thereto with lengths to meet later mounting requirements. Also the light source of one element can be substituted for the light source of any of the other elements. When the outer refracting elements hold these inner element assemblies (Fig. 7 to Fig. 15) in close alignment with each other, then the inner elements need not be hermetically sealed together, but can be slightly separated; or they can be just cemented together with a suitable cement.

In the description of the lamps and full-beam refracting elements shown herein, it is obvious that the sequence of building operations described can be changed without materially altering the finished lamps or elements; also the parts of one lamp or element can be substituted for similar parts in the other lamps or elements, described herein or in my copending applications Serial Numbers 480,420; 480,421; 480,422; 480,423 and 480,425, thus making other combinations too numerous to show by drawings, therefore a further object of this invention, is that each part or each feature of that part which can be used with another part or feature shown or described herein, shall be an improvement of this invention.

Whenever the words "refracting element" or "full-beam refracting element" or "inner full-beam refracting element" or "outer full-beam refracting element" or the plural "elements" in place of "element" with said words, are used herein, they are intended to mean the refracting elements shown and described herein, or in my copending applications Serial Numbers 480,420; 480,421; 480,422; 480,423 and 480,425, or any full-beam refracting element which is made with any improvement or feature described herein or therein.

Whenever the words "hollow metal wire" or "high pressure gas" or "hermetically sealed" or "final seal" or "pin-head electric lamp" are herein referred to, they are intended to have the same meaning as described in one or more of the previously mentioned patents (2,097,679; 2,137,732; 2,154,542; 2,222,093) from which this invention is a continuation in part.

Whenever the words "convex lens" or "convex lens shape" or "convex lens cross-section" are used herein to describe a curve or surface, they are intended to mean that such curve or surface has a form which resembles a convex lens or a convex lens curve; or any type of lens curve or surface which is corrected optically for spherical and chromatic aberration; or any type of curve or surface which will refract light-rays.

In view of the drawings and preceding description, it is obvious that the improvements of this invention can be used to make many more piped light full-beam electric lamps other than those shown and described herein; therefore in anticipation of the manufacture of such lamps, it is a further object of this invention to extend the claims to include any electric lamp which uses one or more of the improvements described or claimed herein.

I claim:

1. A piped light electric lamp having a light source, leads to said light source, a receptacle closing the same, said receptacle composed of two transparent bodies hermetically sealed together, an interior space enclosed by said receptacle being a light source chamber for said light source, said light source chamber having lens surfaces with prism reflecting sections arranged to form full-beam refracting elements and gather light-rays in nearly all directions from said light source into two opposing directions to form predetermined light beams.

2. A piped light full-beam electric lamp having a light source, lead-in wires to said light source, two bodies composed of light transmitting material hermetically sealed together around a light source chamber, said light source chamber having lens and prism sections arranged to form full-beam refracting elements and gather light-rays in nearly all directions from said light source therein into two opposing predetermined directions forming two light beams, said bodies having two outer prism light reflecting surfaces to reflect said two light beams in approximate parallel directions.

3. An outer full-beam refracting element for an electric lamp, consisting of, two bodies of light transmitting material hermetically sealed together on their junction surfaces, said junction surface of each body having two recesses formed therein with one recess formed for a light source chamber and the other recess formed for a prism light reflecting surface, each of said bodies being cylindrical with a flat face opposite said junction surface, said recess for a light source chamber having lens sections in collaborate arrangement with said prism light reflecting surface to form two of said bodies matching on their junction surfaces into a full-beam refracting element and give the maximum light value in predetermined directions.

4. An inner full-beam refracting element for an electric lamp, consisting of, two bodies of light transmitting material matching together on their junction surfaces, each body having a recess formed in its junction surface with lens surfaces therein arranged into a light source chamber, the outer surface of said bodies being complementarily formed with said lens surfaces of said light source chamber into lens sections arranged to form a full-beam refracting element and give a maximum light value in predetermined directions.

5. An inner full-beam refracting element assembly for an electric lamp, consisting of, a light source, lead-in wires connecting to said light source, a receptacle closing the same, said receptacle consisting of two bodies made from light transmitting material matching on their junction surfaces, said receptacle having a light source chamber with said light source therein, the outer surfaces of said receptacle being in unison with the inner surfaces of said light source chamber to form lens sections, all of said lens sections arranged to form full-beam refracting elements and gather light-rays from said light source in nearly all directions therefrom into predetermined directions.

HAROLD SWANSON.